United States Patent [19]

Weisbecker et al.

[11] 4,206,457

[45] Jun. 3, 1980

[54] COLOR DISPLAY USING AUXILIARY MEMORY FOR COLOR INFORMATION

[75] Inventors: Joseph A. Weisbecker, Cherry Hill; Philip K. Baltzer, Princeton, both of N.J.

[73] Assignee: RCA Corporation, New York, N.Y.

[21] Appl. No.: 864,765

[22] Filed: Dec. 27, 1977

[51] Int. Cl.[2] .................... G06K 15/20

[52] U.S. Cl. .................... 340/703; 340/744; 340/799

[58] Field of Search .................... 340/324 AD, 701, 703

[56] References Cited

U.S. PATENT DOCUMENTS

| | | | |
|---|---|---|---|
| 3,624,634 | 11/1971 | Clark | 340/324 AD |
| 3,771,155 | 11/1973 | Hayashi et al. | 340/324 AD |
| 3,854,130 | 12/1974 | Ligocki | 340/703 |
| 3,911,418 | 10/1975 | Takeda | 340/324 AD |
| 4,016,544 | 4/1977 | Morita et al. | 340/324 R |
| 4,150,364 | 4/1979 | Baltzer | 340/703 |

FOREIGN PATENT DOCUMENTS 2049284 4/1971 Fed. Rep. of Germany .

*Primary Examiner*—David L. Trafton
*Attorney, Agent, or Firm*—H. Christoffersen; Samuel Cohen; Donald W. Phillion

[57] ABSTRACT

Method and circuit for controlling the color of dot elements in a raster scan display having a data memory for storing the state (on or off) of dot elements which are mapped onto the raster scan display and a smaller auxiliary memory for storing color information. The color information stored in a location of the auxiliary memory specifies the color of a plurality of contiguous dot elements so that the auxiliary memory can be much smaller than the data memory. The contiguous dot elements whose color is specified by a location in the auxiliary memory form a block which can be arranged so that the address bits to the auxiliary memory form a proper subset of the address bits to the data memory.

5 Claims, 1 Drawing Figure

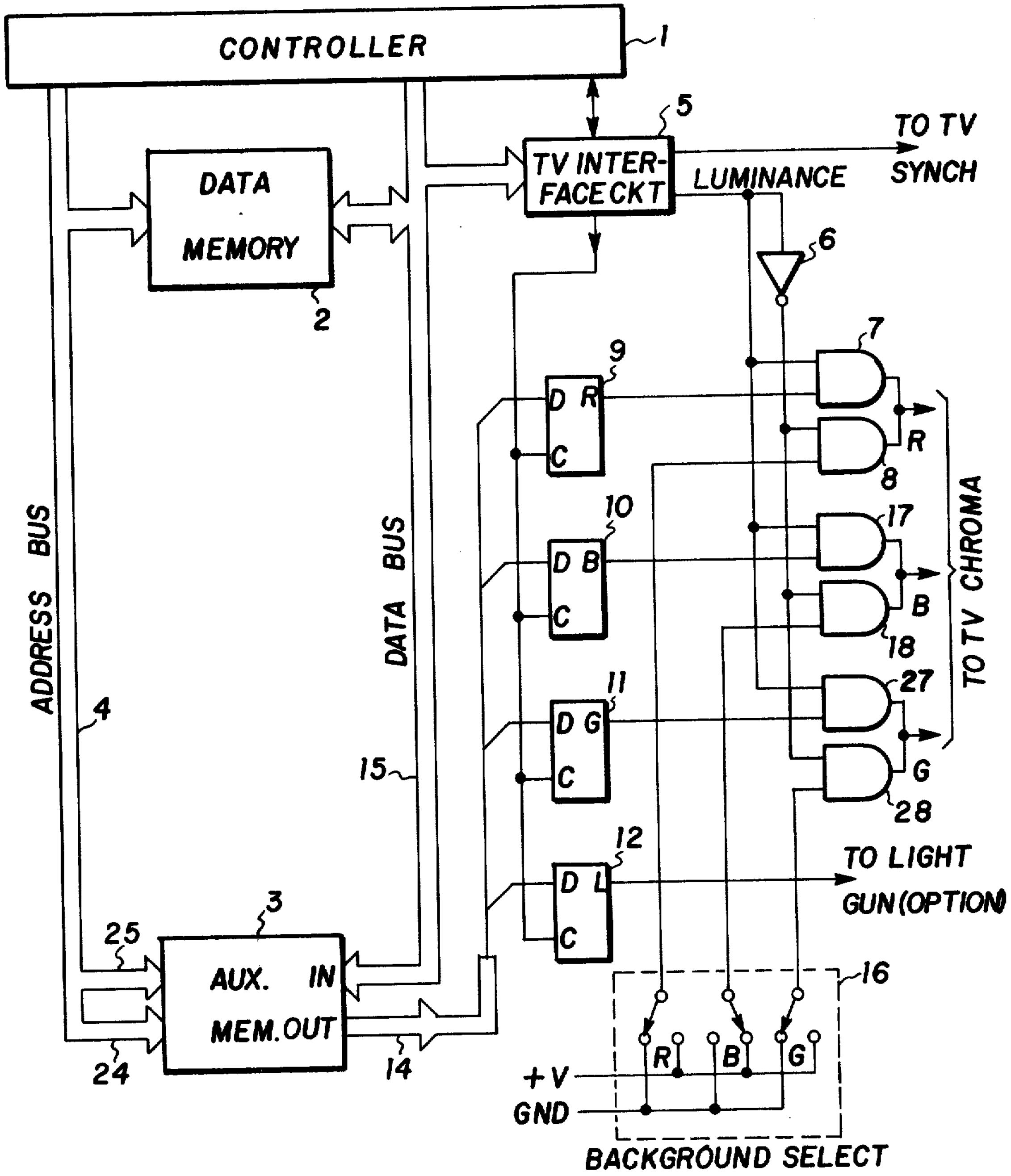
CONTROLLER
1
DATA MEMORY
2
TV INTER-FACE CKT
5
TO TV SYNCH
LUMINANCE
6
7
8
R
17
B
18
27
G
28
TO TV CHROMA
D R
C
9
D B
C
10
D G
C
11
D L
C
12
TO LIGHT GUN(OPTION)
ADDRESS BUS
4
DATA BUS
15
AUX. IN
MEM. OUT
3
25
24
14
16
R
B
G
+V
GND
BACKGROUND SELECT

COLOR DISPLAY USING AUXILIARY MEMORY FOR COLOR INFORMATION

This application is related to patent application Ser. No. 864,764, now U.S. Pat. No. 4,149,152, by Paul M. Russo, entitled "Color Display Having Selectable Off-On and Background Color Control," filed on the same date and assigned to the same assignee as this application.

This invention relates to the communication of information in color, particularly on a raster scan display device such as a color television receiver.

The raster of a television receiver provides a low-cost display medium for microcomputers, minicomputers, and other similar low-cost small control devices when used to display dot elements stored in data memory. The luminance signal (depicting on or off) is stored in the data memory as a binary variable (bit) having a value of 1 or 0 for each dot element of the display. One binary value of stored information indicates a light dot or "on" spot and the other binary value, a dark dot or "off" spot. When color information is to be displayed, the number of bits stored in the memory is tripled because three bits of information are required, one to control each of the red, blue, or green guns of the color display, for each dot element displayed. An example of such a system is shown in U.S. Pat. No. 4,016,544.

An alternative to storing three bits of information per dot for a color display is shown in U.S. Pat. No. 3,624,634 (assigned to the same assignee as this application). In this circuit, the information is transmitted for the first dot element of each line in the display and the same color is used for the rest of the line. For purposes of displaying alpha-numeric text, where various colors are used for each line of text for emphasis, this system provides satisfactory color control without requiring three bits for every dot element of the display. For other purposes, such as video games and the like, however, this method sometimes is not entirely satisfactory as it does not provide any variation in the color of a line.

A system according to the invention uses an auxiliary memory that stores fewer bits than the data memory storing the luminance information for each dot element to be displayed. Color information can be varied during a line to provide a semblance of complete color control. This permits a high resolution luminance signal with a lower resolution chrominance signal. Experience has indicated that the eye is not capable of resolving small color changes on TV-type color displays so lower chroma resolution is not necessarily a disadvantage and it permits a substantial cost saving in that extra apparatus which would be required to provide high chroma resolution is not needed.

Another advantage of a color display system according to the invention is that it can be used with systems designed for black-and-white display with only minor modifications. Only some additional hardware and the loading of color information is required.

A further advantage is that color information can be changed between display frames to correlate with active information on the display while reducing the bandwidth of the signal below that required for high resolution chroma.

In a method according to the invention, luminance data is supplied to be displayed on a raster scan medium as an array of dot elements arranged in a plurality of lines. Color data is provided representative of the color of a plurality of groups of N contiguous dot elements with each group being in successive horizontal lines and forming subarrays having a length less than a complete line.

In the drawing, the FIGURE is a logic diagram of a circuit using a preferred embodiment of the invention.

In the circuit of the FIGURE, a controller 1 is coupled to a data memory 2 and to an auxiliary memory 3 via an address bus 4 and a data bus 15. The controller 1 can be implemented as a microprocessor, a minicomputer, or a sequential machine. Its basic purpose is to load the data memory 2 with the luminance information for a color TV display wherein each bit corresponds to a dot element on the display, which display comprises an array of dots arranged in the lines of the raster. The auxiliary memory 3 is loaded with information designating blocks of color to be used in the display.

The controller 1 may also provide a sequence of addresses on the address bus 4 that addresses both the display data to be transferred to a TV interface circuit 5 from the data memory 2 and the color information to be transferred to three latches 9–11 from the auxiliary memory 3 during the display. Alternatively, a more complex TV interface circuit 5 could be arranged to supply the sequence of addresses. When used with COSMAC-type microprocessors (CDP1802, RCA Corporation), however, the controller (COSMAC) supplies the addresses. A fourth latch 12 is shown which can be used for optical functions such as a light gun when used with video games of certain kinds.

The TV interface circuit 5 accepts N bits, usually a byte (8 bits) of luminance information from the data memory 2 and shifts out one bit at a time to provide a luminance signal in proper time relation with standard television synchronizing pulses which are also provided. An example of a suitable TV interface circuit 5 is a Video Display Controller CDP1861 (RCA Corporation). Detailed information on the operation of this circuit with COSMAC-type microprocessors is available in the data sheets supplied by the manufacturer, but for purposes of explanation of the present invention, it is only necessary to understand that the luminance information is shifted serially from the circuit 5 at the proper time to coincide with its desired position on the TV raster. When used with a black-and-white display, the luminance information is coupled to the video circuit of the display device, i.e., a TV receiver or monitor.

When used with a color display device, such as a color television receiver, the luminance information is not coupled to the display device (television receiver), but to a set of gates as described below. The output signals from these gates are chroma signals to the red, blue and green guns of the television receiver. These signals can be coupled directly to the color amplifiers for each color gun or they can gate signals having the proper phase relation with the receiver's color oscillator for each color to a mixer that generates composite video. If used to modulate a carrier, the composite video can be coupled to the antenna terminals of the TV receiver being used as the display device.

Each set of gates providing the individual color signals is comprised of two AND gates per color. The AND gates 7 and 8 provide the red signals, the AND gates 17 and 18 provide the blue signals, and the AND gates 27 and 28 provide the green signals.

The AND gates 7, 17 and 27 are controlled by the luminance (dot) information from the TV interface circuit 5. The other input signal to the AND gates 7, 17 and 27 is the output signal from one of the flip-flops 9–11, respectively. These flip-flops store the information specifying the color of the display dot elements when the dots are on, i.e., when the luminance information is binary one (high level) in this example. The background color information is preset, such as by switches, in the background color select circuit 16. When the luminance information is binary zero (low level), in this example, an inverter 6 produces a high signal that primes the AND gates 8, 18 and 28, which are enabled to provide a respective color signal if the associated switch in the background select circuit 16 is coupled to a binary one (+V) and are disabled if the switch is coupled to binary zero (GND).

The system shown can display the dots and background in any of eight colors, viz., the eight possible combinations of three colors. The red, blue and green guns in the display are on or off. Using more bits for each color permits the saturation level of each color to be adjusted. For example, two bits per color provides four levels of each color's saturation. There would then be sixty-four possible color combinations. The circuitry involved would be more complex, requiring two AND gates per color for the dot-on and two for the background colors with digital-to-analog converters—which could be implemented by a resistor network—for each set of AND gates. Multi-level color saturation is considered to be an extension of the present invention, involving the same principle of operation, and it therefore is not illustrated separately.

The output signals from the AND gates for each color are illustrated as wired-OR. In practice, isolation impedances such as resistors may be provided. This also is considered to be a modification within the skill of the art.

Before describing in detail the operation of the circuit, the operation and organization of the memories will be described. The data memory 2 is a standard digital memory having a single data output/input port coupled to the data bus 15 and having addressing means coupled to the address bus 4. The address bus 4 includes the control lines necessary for proper memory operation such as timing signals and signals indicating whether a read or write to the memory is to be performed.

The auxiliary memory 3 is shown as having two address input ports 24 and 25 and two data ports. The data-in port is coupled to the data bus 15 and the data-out port is coupled to a bus 14. Whereas the data terminals of the data memory 2 are bi-directional and coupled to the data bus in the usual way, the data ports of the auxiliary memory 3 are uni-directional. Uni-directional data ports are well known in the art; see, for example, a 256×4 random access memory CDP1822 (RCA Corporation). The advantage of using separate data output ports will be clear from the description of the operation below. Only three bits per address—four if the light gun or other option is desired—are required in the auxiliary memory 3 in this example.

Two address ports 24 and 25 are used to permit data to be written into the auxiliary memory 3 at locations designated by one address and to retrieve the same data from the same locations but designated by a different address than that used for writing. The use of a dual address port is not required for an understanding of the invention, but it is convenient for the following reasons. As will be seen below, during the display time, the data memory 2 and the auxiliary memory 3 are addressed by the same set of address bits. Data at the particular locations in the memory, however, are not the same because the data memory contains luminance information for each dot whereas the auxiliary memory contains fewer locations storing color block information. Since different information is to be written into the memories, the controller 1 must be able to select during memory loading which memory the data on the bus 15 is to be stored in, at the location specified by the address on the address bus 4. One way of doing this is to make the auxiliary memory responsive to a different address from that of the data memory when data is to be written. (An alternative method would be to supply control signals that enabled only the memory to which the data was to be written.) Essentially, the address port 25 is coupled internally to an encoder which is enabled by a signal indicating that a memory write is being performed and the address port 24 is coupled to a decoder which is enabled by a signal indicating a memory read is being performed. The read and write signals are available as part of the address bus as mentioned above. The auxiliary memory 3 is shown as storing four bits in each location, but only three are required for the color information, the fourth bit for the light gun being an optional feature. The loading of the data memory 2 and the auxiliary memory 3 need not be detailed for an understanding of the invention. It is only necessary to note that the output bus 14 from the auxiliary memory 3 is independent from the data bus 15.

For purposes of explanation, it is assumed that the data stored at each location in the data memory 2 consists of eight bits (one byte), that each location in the auxiliary memory 3 stores four bits, and that the active display area on the TV raster is an array of dots arranged in 64 rows of 128 dots each. Thus, the data memory 2 must contain 1,024 bytes of data (8,192 bits). The color information will be assumed to be specified for blocks eight dots wide and four dots high. Therefore, the auxiliary memory 3 will require only 256 storage locations. To address 1,024 bytes in the data memory 2, ten binary address bits are required, but for 256 color locations, only eight bits are required to specify an address in the auxiliary memory 3. The eight-bit address of the color information must, however, specify the location of the color data corresponding to the proper byte being addressed in the data memory by ten address bits. This can be done by selecting the proper eight out of ten address bits and no address conversion is required. Designating the ten address bits for the data memory as $2^9$–$2^0$, the auxiliary memory 3 is addressed with the $2^9$–$2^6$ and the $2^3$–$2^0$ bits of the data memory address, i.e., the four most significant and four least significant bits of the data memory address. Therefore, it is clear that the auxiliary memory address is a proper subset, viz., a smaller part, of the memory address for the data memory 2. Also, as the memory address to the data memory 2 sequences from all-zeroes to all-ones, the color addresses will change so that each eight-by-four subarray of the display array addresses the same color information. The auxiliary memory requires only 3/32 ($\frac{1}{8}$ counting the fourth light gun bit) the volume of the data memory 2. Other arrangements of subarrays as color blocks could be designated. For example, a 16×8 color block, i.e., sixteen dots wide and eight dots high would lower the color resolution but further reduce the size of auxiliary memory required. Only 64 locations would be required in the auxiliary memory 3 and could be addressed by six bits which, in this case, would be the three most significant and three least significant bits of the data memory address.

It has been shown how an auxiliary memory which is substantially smaller in size than the data memory can be used to store color information while providing satisfactory color resolution and which can be controlled to interact with the luminance data on a color display. The data memory 2 and the TV interface circuit 5 (in addition to the controller 1) are used in displaying information in black-and-white TV rasters. To display color information, only the auxiliary memory 3, latches 9–11, background select switches 16, and the AND gates 7, 8, 17, 18, 27 and 28 need be added without changing the existing hardware or data.

As the addresses on the address bus 4 are sequenced during the display time, the luminance information from the data memory 2 is transferred, in this example as eight bits in parallel, to the TV interface circuit 5 via the data bus 15. The luminance information is accepted in parallel and shifted out serially one bit at a time from the interface 5. At the same time, the color information is read out to the bus 14 and latched in flip-flops 9–11 in response to a control signal from the interface circuit 5 or controller 1. In a COSMAC-type controller, the latching signal can be TPB, which is explained in the data sheet for the CDP1861 (RCA Corporation) mentioned above.

The luminance information shifted serially from an output terminal of the interface circuit 5 is coupled to the AND gates 7, 22 and 17. The luminance information is inverted by the inverter 6 and coupled to the gates 8, 18 and 28.

The flip-flops 9–11 provide the color signals that activate the AND gates when the luminance data indicates a dot is to be displayed. When no luminance dot is to be displayed, the color is designated by the background select circuit 16.

What is claimed is:

1. A method for displaying information in color on a raster scan medium comprising the steps of:

supplying, under programmable control, luminance data to be displayed as an array of dot elements arranged in successive horizontal lines with each horizontal line being comprised of a series of successive groups of N dot elements;

mapping each successive dot element of each group of dot elements one at a time on the raster scan medium with some dot elements having luminance and some dot elements not having luminance in accordance with said luminance data; and providing color data, under programmable control, representative of the color of dot elements having luminance in two or more groups of N dot elements with each group of N dot elements being positioned in successive horizontal lines to form subarrays which begin and end at corresponding positions on said successive horizontal lines.

2. The method as claimed in claim 1, where said supplying step includes the steps of:

storing the luminance data under said programmable control as binary information, one bit corresponding to each dot element in the display; and retrieving the luminance data in sequence; and wherein said providing step includes the steps of:

storing the color data as groups of bits for each subarray, a bit of a group corresponding to the red, blue and green components of the color of the dots of the subarray; and retrieving the color data for a subarray simultaneously with the retrieving of the luminance data corresponding to the dot elements within the subarray.

3. The method claimed in claim 2 including the steps of:

supplying background data to be displayed in the absence of dot elements; and gating said color data, under said programmable control, as color signals to the raster scan medium when the programmable luminance data indicate a dot element is to be displayed and said background data as color signals to the raster scan medium when the luminance indicates no dot element is to be displayed.

4. A system for programmably controlling the color of a raster scan display means which maps dot elements derived from a digital memory onto the raster in successive horizontal lines with each line being formed by successively mapping the dot elements, one by one, and comprising in combination:

programmable control means;

programmable data storage means responsive to said programmable control means for storing at locations therein bits corresponding to the luminance information of each dot element to be displayed;

auxiliary storage means having fewer storage locations than said data storage means and responsive to said programmable control means for storing at each location therein chroma information indicative of the color in which a plurality of contiguous dot elements forming a block of at least two rows of dot elements high and less than a full line in length, is to be displayed;

synchronizing means including addressing means coupled to said data storage means and said auxiliary storage means for providing synchronization signals to the raster scan display means and for extracting in proper relation with said synchronization signals the bits from said data storage means and the chroma information from said auxiliary storage means;

said addressing means comprising a first plurality of addressing signal means for specifying the location in said data storage means from which said luminance information is to be retrieved and for mapping said dot elements on the scan display means in successive rows with each row of dot elements comprising a plurality of groups of N dot elements;

said addressing means further comprising a second plurality of addressing signal means for specifying the location from which said chroma information is to be received, said second plurality of addressing means corresponding to a proper subset of said first plurality of addressing signal means; and said second plurality of addressing signal means controlling the color of a group of N dot elements in each of two or more adjacent rows of dot elements with each group of N dot elements beginning and ending at corresponding horizontal coordinates in said rows of dot elements.

5. A system as in claim 4 further comprising:

color select means for supplying signals indicative of a background color; and gating means responsive to said luminance information for gating said chroma information to said raster scan display means from said auxiliary storage means when said luminance information has one binary value and for gating the signals from said color select means when said luminance information has the other binary value.

* * * * *